United States Patent

[11] 3,628,343

| [72] | Inventors | Harold M. Bradbury<br>1217 W. Brooks;<br>Robert I. Loeffler, 1200 Caddell; Jerry L. Lott, 725 Schulze St.; Billy L. Thomas, 510 Sunrise, all of Norman, Okla. 73069 |
|---|---|---|
| [21] | Appl. No. | 765,211 |
| [22] | Filed | Oct. 4, 1968 |
| [45] | Patented | Dec. 21, 1971 |

[54] METHOD FOR ROTATIONAL ENERGY EXCHANGE CRYSTALLIZATION AND MATERIAL SEPARATION
12 Claims, 10 Drawing Figs.

[52] U.S. Cl. .................................................. 62/58, 210/59, 233/11
[51] Int. Cl. ............................................... B01d 9/04
[50] Field of Search .......................................... 62/58; 210/59; 208/37, 38; 260/707; 233/11

[56] References Cited
UNITED STATES PATENTS

| 1,464,707 | 8/1923 | Habgood | 208/37 |
| 1,939,946 | 12/1933 | Baylis | 208/37 |
| 2,144,652 | 1/1939 | Fulton et al. | 208/37 |
| 2,305,464 | 12/1942 | Ashworth | 210/59 |
| 3,214,371 | 10/1965 | Tuwiner | 62/58 |
| 2,769,852 | 11/1956 | Paulson | 62/58 |
| 3,350,297 | 10/1967 | Torobin | 208/37 |
| 3,399,538 | 9/1968 | Sliepcevich et al. | 62/58 |
| 3,398,547 | 8/1968 | Sliepcevich et al. | 62/58 |

*Primary Examiner*—Wilbur L. Bascomb, Jr.
*Assistant Examiner*—R. T. Foster
*Attorney*—Dunlap, Laney, Hessin & Dougherty ABSTRACT: A process and apparatus for effecting exchange crystallization and component separation in a nongaseous mixture by subjecting the mixture to compressional and centrifugal forces. The apparatus employed includes a mixture confining chamber, structure for moving this chamber through a curvilinear path so that an acceleration producing force acts on the mixture tending to change its direction of movement toward a barrier wall of the chamber, a mixture conveyance system for conveying the mixture to the chamber, and discharge ducts or passageways for removing one part of the mixture from a location relatively near the barrier wall, and another part of the mixture from a location relatively remote from the barrier wall.

INVENTORS
HAROLD M. BRADBURY,
ROBERT I. LOEFFLER,
JERRY L. LOTT &
BY BILLY L. THOMAS

ATTORNEYS

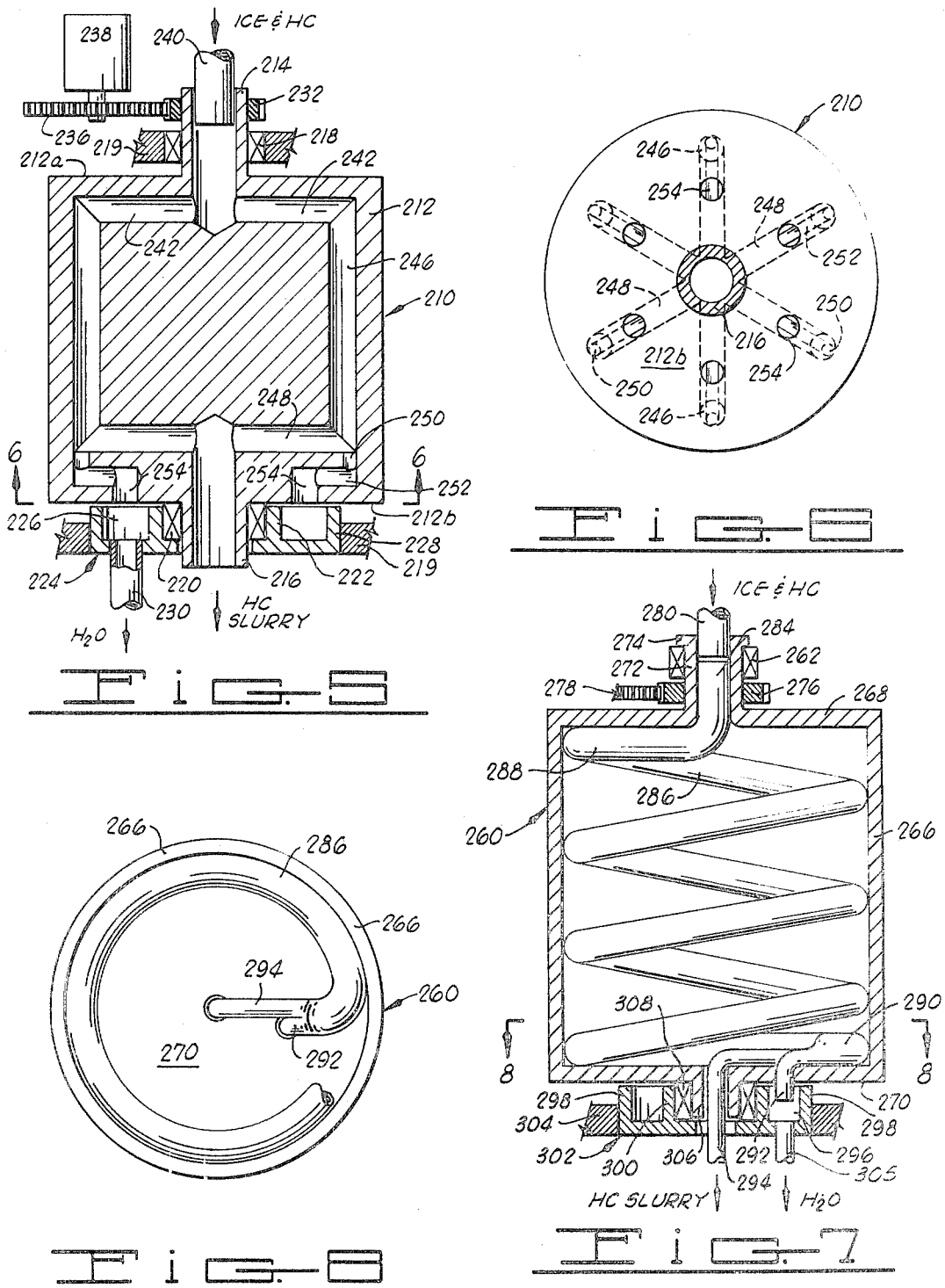

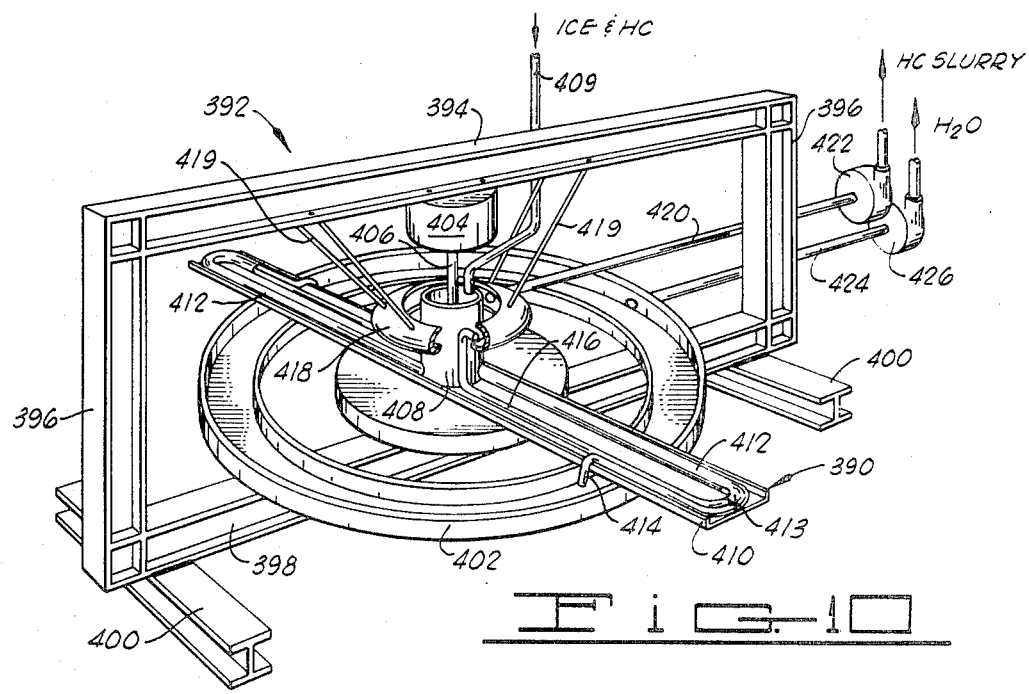
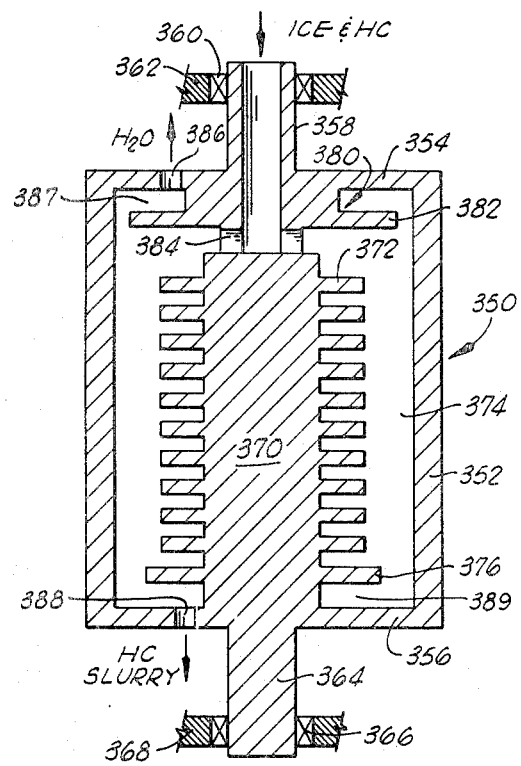

3,628,343

METHOD FOR ROTATIONAL ENERGY EXCHANGE CRYSTALLIZATION AND MATERIAL SEPARATION

BACKGROUND OF THE INVENTION

1. Field of the Invention

This invention relates to a process and apparatus for simultaneously applying an acceleration producing force and an opposing compressional force to a mixture of materials so as to change the physical state of one or more components of the mixture due to the application of pressure thereto, and to simultaneously effect separation of a plurality of the components from each other according to differences in the densities thereof. More specifically, the invention relates to a method and apparatus for efficiently exchanging thermal energy between two materials to simultaneously convert one of the materials from a liquid to a solid, and the other material from a solid to a liquid, while concurrently separating the materials from each other. In one aspect, the invention provides a technique and apparatus for its performance which are highly useful in a recently proposed process for recovering relatively pure, low salt content water from brackish or saline aqueous solutions.

2. Brief Description of the Prior Art and its Relation to the Present Invention

The use of centrifuge devices for separating substances of differing densities is well known. It is also known that substances subjected to centrifugation are subjected to compression as a result of the oppositely acting centripetal and centrifugal forces.

The present invention applies this knowledge to the improvement of a recently proposed process for recovering fresh water from saline aqueous solutions, such as brackish waters and sea water, though the utility of the invention extends to areas outside the field of desalination. The desalination process to which reference is made makes use of what has variously been referred to as exchange crystallization or melting point inversion. In such exchange crystallization method of desalination to produce relatively fresh or pure water, a saline aqueous solution is subjected to heat exchange with a material which undergoes an increase in melting point with increase in pressure. As a result of this heat exchange, ice crystals are frozen from the water, and solid particles of the heat exchange material are melted. At a later stage in the process, the ice crystals frozen from the saline solution, along with the heat exchange medium, are isolated from the more concentrated saline solution remaining after freezing ice crystals therefrom, and the separated ice crystals and heat exchange medium are then subjected to pressurization. As the pressure of this system is increased, the ice crystals are melted to produce fresh water and the heat exchange medium is concurrently partially frozen to produce solid particles. The solid particles of heat exchange medium are thus regenerated for use in the first step of the process after the fresh water has been separated therefrom.

From this cursory description of the exchange crystallization desalination process, it will be perceived that a continuous, cyclical procedure is involved in which a material which undergoes an increase in freezing point with an increase of pressure is subjected in two sequential steps to heat exchange with, it the first case, the saline solution, and in the second step, with ice crystals, so that the water initially undergoes freezing and, in the later stage, undergoes melting. The solid particles of the slurry are at first melted, and are then regenerated during the concurrent melting of the ice crystals. During the final exchange crystallization stage in which the ice is melted and the slurry is regenerated by the formation of solid particles, it is necessary to impose sufficient pressure on the system that the freezing point of water will be lowered to a point at which the ice present in the system will melt, and the freezing point of the heat exchange medium utilized will be increased sufficiently to freeze solid particles of this material, and thus regenerate the slurry. Following this step, it is, of course, necessary to separate the fresh water thus produced from the regenerated slurry, and to then recirculate the slurry to the first stage of the process in which ice crystals are frozen from the saline aqueous solution.

Several types of systems have been heretofore proposed for accomplishing the high pressure, final stage of the exchange crystallization method of desalination, and some of these are described in U.S. Pat. Nos. 3,398,547 and 3,399,538 assigned to the assignee of the present application. Since it is at this stage of the exchange crystallization method of desalination that the largest expenditure of energy is involved, however, there is a continuing need to reduce the energy requirement at this stage of the process, and to improve the efficiency with which both the exchange crystallization may be accomplished and the separation of ice and slurry carried out.

We have now appreciated that the final, high pressure stage of the described exchange crystallization procedure can be advantageously carried out by directing the mixture subjected to exchange crystallization into a confining chamber which is moved through a curvilinear path so that an acceleration producing force or local radial force tending to return the chamber to a linear path also acts on the mixture and forces it against a barrier wall of the chamber. In turn, the barrier wall, being held in position by centripetal force constitutes an element introducing compression to the mixture so that the pressure level necessary to achieve the required inversion of melting points is obtained. Simultaneously with the pressure buildup due to the acting forces, the acceleration producing force effects a separation of those materials in the mixture which have significantly different densities—these being, in the case of the desalination procedure, fresh water and the regenerated slurry material, which is most frequently a hydrocarbon.

Broadly described then, the process of this invention, both as it may be applied to the described desalination produced, and as it may be applied beneficially to other processes, comprises initially forming a mixture of nongaseous materials, with the components of the mixture including at least one material which undergoes a decrease in its freezing point when subjected to increasing pressure, and also including a second material which undergoes an increase in its freezing point when subjected to an increase in pressure. Moreover, the materials having the contrasting melting point characteristics described are also of differing density. The mixture thus prepared is positioned in a confining chamber which is moved through a curvilinear path so that the mixture is subjected to a force which tends to move the liquid against a barrier wall of the confining chamber. The movement of the confining chamber through the curvilinear path is continued so that the acting forces move relatively denser components of the mixture toward the barrier wall relative to the components of the mixture which are of lesser density. Simultaneously, the forces acting on the mixture develop a pressure in the mixture sufficient to cause one component of the mixture to melt and another component of the mixture to freeze at the prevailing temperature within the confining chamber. As a final step of the process of the invention, two different portions of the mixture are removed from the confining chamber during its continued movement through the curvilinear path, with one of these portions being the relatively more dense portion which is moved toward the barrier wall, and the other component being a relatively less dense component and being at least in part in a different physical state from that of the first component. In a preferred embodiment of the invention, the confining chamber is moved in uniform circular motion, and the mixture subjected to the process of the invention comprises a mixture of a saline solution and a hydrocarbon material which is immiscible in the aqueous solution and water, and which has a freezing point relatively close to that of water.

The apparatus employed in carrying out the process of the invention may take a number of forms, some of which resemble, in some respects, separatory centrifuges heretofore used for separating liquids having differing densities. Since, however, in the practice of the present invention, one effect achieved is that of exchange crystallization or melting point inversion, in addition to the separation of certain components of the mixture, and since this consideration dictates certain variations in structure from that utilized in conventional centrifuges when certain preferred embodiments of the apparatus of the invention are constructed, I have chosen to term the devices which are employed in the invention rotoverters, since this term connotes the melting point inversion or conversion of physical state which transpires in the practice of the invention.

Broadly described, the rotoverters employed in carrying out the process of the invention include a mixture confining chamber having driving structure drivingly connected thereto for moving this chamber through a curvilinear path in a continuous manner. There is also provided structure for continuously introducing to the confining chamber during such movement, the mixture which is to be subjected to exchange crystallization and the acting separatory forces hereinbefore described. Finally, there is provided a pair of component offtake structures, which offtake structures are in continuous communication with the interior of the confining chamber during its movement, and which function to receive from the confining chamber, separated portions of the mixture therein as such separation is effected by the forces developed and acting on the mixture as a result of the curvilinear motion of the confining chamber.

To more specifically describe one embodiment of the rotoverter used in practicing the invention, this structure includes an inner wall and an outer barrier wall defining between them an annular space and constituting the described confining chamber. The inner and outer walls are mounted on supporting structure for rotation in a symmetrical fashion about an axis of rotation. There are further provided at least one mixture supply conduit extending radially with respect to the axis of rotation and communicating with the annular space between the inner wall and the outer barrier wall, and a pair of fluid discharge passageways which also extend radially with respect to the axis of rotation and communicate with the annular space between the inner and outer walls. One of the fluid discharge passageways is positioned for receiving from this space the portion of a mixture within this annular space which is closest to the inner wall, and the other of the fluid discharge passageways receives a portion of the mixture which is relatively close to the outer barrier wall. Means are provided for driving in rotation the described structure, including the inner and outer walls, the supporting structure, and the mixture passageways communicating therewith; for supplying the mixture to be subjected to the process to the mixture supply conduits; and for receiving separated portions of the mixture from the fluid discharge passageways.

It will be recognized from the foregoing discussion that the utility of the process, and the apparatus employed in carrying it out, is not confined to a desalination process, but that the invention finds application in other instances where the simultaneous inversion of melting points and separation of materials can be utilized to advantage. As examples of such utility might be cited the recovery of relatively pure water from many types of aqueous solutions, and the generation of solid particles of hydrocarbon materials by heat exchange for a multiplicity of uses.

From the foregoing description of the invention, it will have become apparent that an important object of the invention is to provide a process and apparatus by which a mixture of certain materials can be simultaneously subjected to exchange crystallization or melting point inversion and concurrently caused to undergo a division or separation into a plurality of components having different densities.

An additional and more specific object of the invention is to provide an improved apparatus for carrying out exchange crystallization in a desalination process.

Another, yet more specific of the invention, is to provide a method and apparatus, through the use of which, the high pressure melting point inversion step utilized in producing fresh water from saline aqueous solutions can be performed more economically than by methods, and those the use of that apparatus, which have heretofore been proposed.

Additional objects and advantages of the invention will become apparent as the following detailed description of the invention is considered in conjunction with the accompanying drawings which illustrate the invention.

BRIEF DESCRIPTION OF THE DRAWINGS

FIG. 5 is a view, partially in section and partially in elevation, with such section being taken approximately through the center of yet another embodiment of the invention.

FIG. 6 is a sectional view taken along line 6—6 of FIG. 5.

FIG. 7 is a view, partially in section and partially in elevation, of yet another embodiment of the apparatus of the invention.

FIG. 8 is a sectional view taken along line 8—8 of FIG. 7.

FIG. 9 is a schematic sectional view of another embodiment of the apparatus of the invention.

FIG. 10 is a perspective view of another embodiment of the rotoverter apparatus of the invention.

DETAILED DESCRIPTION OF THE PREFERRED EMBODIMENTS OF THE INVENTION

Figures 1, 2:
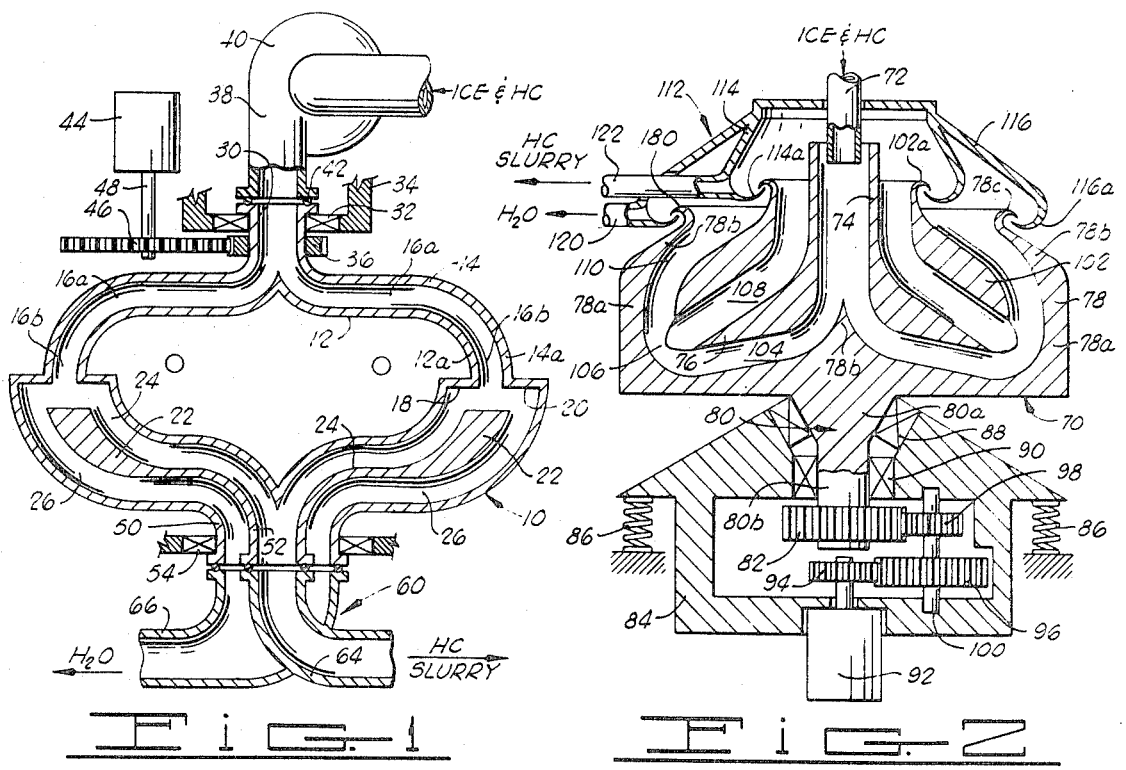
FIG. 1 is a partially sectional, partially elevational view of one embodiment of the rotoverter employed in practicing the process of this invention.
FIG. 2 is a partially sectional, partially elevational, view of a different embodiment of the apparatus useful in the invention.

In referring to each of the different forms of rotoverter constructed in accordance with the principles of the present invention and hereinafter described, the practice of the process of the invention in these structures will be described, by way of example, in the context of the recovery of relatively fresh or pure water from a saline solution. It will be presumed that, in the course of such process, there has been developed in the preliminary steps of a desalination process, a mixture which contains ice crystals and a heat exchange medium which is a hydrocarbon material. In the drawings, this material in the liquid state is designated by the symbol HC, and where a slurry of the hydrocarbon material is formed containing both liquid and solid particles, it is referred to in the drawings as "HC slurry." An example of a system which may be utilized in carrying out exchange crystallization for the recovery of relatively pure water from a saline solution includes ice crystals formed by the freezing of ice crystals from the saline solution, and a eutectic mixture of pentadecane and benzene. The pentadecane-benzene eutectic mixture has a freezing point at atmospheric pressure of −4.5° C.

EMBODIMENT OF FIG. 1

Referring now to FIG. 1 of the drawings, the rotoverter of the invention here shown is designated generally by reference numeral 10 and includes an inner housing 12 and an outer housing 14 which are concentrically oriented relative to each other and secured by any suitable means to each other for rotation about a common rotational axis. The inner housing 12 includes a radially outwardly positioned inner wall 12a and the outer housing 14 includes a radially outwardly positioned barrier wall 14a. The space 16 between the inner and outer housing, 12 and 14, respectively, constitutes a liquid flow passageway or annulus, and includes a mixture supply conduit portion 16a extends radially outwardly with respect to the axis of rotation of the housing and an annular confining chamber 16b which is located radially outwardly of the supply conduit portion and communicates therewith.

It will be noted in referring to FIG. 1 that the shapes of the inner housing 12 and the outer housing 14 are such that a substantial increase in the radial dimension of the space 16 between these housings is provided throughout a portion of the liquid flow passageway therebetween as a result of the formation of an inwardly directed shoulder 18 on the inner housing 12 and a radially outwardly directed shoulder 20 on the outer housing 14. Positioned within the radially enlarged space between the inner housing 12 and outer housing 14 is an arcuate divider plate 22 which divides this space into a pair of annular fluid discharge passageways. The radially inner annular fluid discharge passageway is designated by reference numeral 24, and the radially outer annular fluid discharge passageway is designated by reference numeral 26.

For the purpose of introducing a mixture to be subjected to the process of the invention to the rotoverter 10, the rotoverter includes a mixture intake duct 30 which communicates with the mixture supply conduit portion 16a of the space 16. The duct 30 constituted a neck formed on the outer housing 14 which projects through and is journaled in, a suitable bearing structure 32 carried by a portion of a framework 34. The duct 30 has secured around its outer periphery, a drive gear 36 which permits the entire rotoverter 10 to be driven in rotation. Aligned and communicating with the duct 30 is a discharge conduit 38 which receives the discharge from a pump 40 used to pump a mixture of ice crystals and hydrocarbon heat exchange medium into the rotoverter. A suitable seal 42 is provided between the discharge conduit 38 and the duct 30. It will be understood that the pump 30 and the discharge conduit 38 extending therefrom are mounted stationarily, while the duct 30 rotates as a portion of the rotoverter 10. For the purpose of driving the rotoverter in rotation about an axis of rotation extending through the center thereof, a suitable electric motor 44 or other prime mover drives a gear 46 through a suitable shaft 48 and the gear 46 is drivingly engaged with the gear 36 keyed to the duct 30.

On the opposite side of the rotoverter from the mixture intake duct 30, the outer housing 14 and the divider plate 22 each taper inwardly to an axially extending neck portion, with the neck portion 50 of the outer housing 14 being disposed concentrically around the neck portion 52 of the divider plate 22. The neck portions 50 and 52 terminate in coplanar alignment, and a suitable bearing 54 is provided in a supporting journal structure which supports the rotoverter 10 for rotations about its rotational axis. It should be pointed out that the rotations axis of the rotoverter 10 is located concentrically with respect to the duct 30, the neck portion 50 and the neck portion 52.

For the purpose of receiving discharged separated portions of the mixture which is charged to the rotoverter, a compound discharge offtake fitting 60 is stationarily mounted adjacent the neck portion 50 of the outer housing 14 and the neck portion 52 of the divider plate 22. The offtake fitting includes a central fluid discharge passageway 64 for receiving material discharged through the neck portion 52 and a concentrically outer discharge passageway 66 for receiving material discharge through the annulus between the neck portions 50 and 52.

OPERATION OF THE FIG. 1 EMBODIMENT

Assuming that in a desalination process, there has been developed at prior stages of the process, a mixture which includes ice particles and a hydrocarbon heat exchange medium. The melting point characteristics of the materials in the mixture are such that, with the application of pressure exceeding a predetermined magnitude to the mixture, the ice crystals will be melted to form water, and apart of the hydrocarbon included in the mixture will be frozen to form solid particles. In the course of this change of state as a result of the imposition of pressure, the hydrocarbon gives up its latent heat of fusion to the ice with the result that the heat exchange is efficiently accomplished by the occurrence of the exchange crystallization. It will be appreciated, of course, from what has been said herein, that the ice particles are derived from sea water or other saline aqueous solution, and are of relatively high purity or, stated differently, relatively low salt content. The hydrocarbon in such procedures is selected to have certain properties including a melting point which is preferably slightly below the melting point of ice at atmospheric pressure, immiscible with water, and nontoxic. A more detailed knowledge of the exchange crystallization desalination procedure in general, and of the properties which characterize the selected heat exchange medium, can be obtained by referring to U.S. Pat. No. 3,399,538 assigned to the assignee of the present invention.

The pump 40 delivers the mixture of ice crystals and hydrocarbon heat exchange medium through the discharge conduit 38 into the mixture intake duct 30. At this time, the rotoverter 10 is being driven in rotation about its rotational axis at a relatively high speed by the motor 44 through the gears 46 and 36. The rotational speed at which the rotoverter 10 is driven will be that which is necessary to obtain a pressure sufficient to effect exchange crystallization or melting point inversion, and to achieve separations in the manner hereinafter described.

As the mixture flows out of the duct 30, it spreads radially outwardly, moving through the mixture supply conduit portions 16a between the inner housing 12 and outer housing 14. The mixture ultimately reaches the confining chamber 16b located at the radial extremity of the rotoverter 10. Here the mixture is subjected to acceleration producing forces tending to change the curvilinear path of movement of the mixture to a tangentially directed path. These forces thus act to force the mixture against the barrier wall 14a of the outer housing 14. The pressure developed within the mixture thus is made to exceed that which is required to effect the exchange crystallization or melting point inversion. The result is that within the confining chamber 16b, all or a portion of the ice is melted as a result of the decrease in its melting point, and a portion of the hydrocarbon is frozen as a result of an increase in its freezing point. There is consequently developed within the confining chamber 16b, a mixture of fresh water, solid particles of hydrocarbon, and hydrocarbon liquid.

It will be understood that the density of the fresh water will differ from that of the hydrocarbon slurry and will, in most systems, be greater than the density of the slurry. For this reason, the water moves radially outwardly with respect to the axis of rotation and assumes a position which is relatively closer to the barrier wall 14a than the position occupied by the hydrocarbon slurry. Stratification of these materials thus tends to occur, and by the imposition of the arcuate divider plate 22 in the path of flow of the mixture through the rotoverter 10, the radially outer portion of the mixture which is relatively concentrated in fresh water is split out to the outside of the divider plate 22 and enters the radially outer annular fluid discharge passageway 26. The hydrocarbon slurry, on the other hand, being located relatively inwardly in a radial sense with respect to the fresh water moves to the inside of the arcuate divider plate 22 and enters the inner fluid discharge passageway 24. It will be noted that the fluid discharge passageways 24 and 16 are directed radially inwardly so as to return the separated portions of the mixture to a point which is relatively near to the axis of rotation of the rotoverter 10. This return flow of the mixture fractions to a location near the axis of rotation of the rotoverter 10 functions to conserve the energy required to drive the rotoverter and to accelerate the flow of the mixture to the required velocities at the outer peripheral location of the confining chamber 16b. It should be pointed out in this connection that the divider plate 22 is preferably made of a material having relatively good thermal insulation properties so that the separated materials are not permitted to undergo a reversal of the exchange crystallization due to a transfer of thermal energy through the divider plate.

The overall density of the mixture, the diameter of the rotoverter as measured thereacross between the extremities of the annular confining chamber 16b, the rotational speed of the rotoverter, the force imposed on the mixture in the rotoverter by the centrifugal pump 40, and the length of the liquid (slurry) column in the legs 16a are all factors which determine the hydraulic pressure imposed upon the mixture within the confining chamber 16b and acting to effect the desired exchanged crystallization. It should further be pointed out that the axial dimension of the confining chamber 16b largely determines the residence time of the mixture under conditions which effect both the desired exchange crystallization and the separation of fractions. It is therefore necessary in the design of the rotoverter to assure a sufficiently large confining chamber 16b that a residence time will be yielded sufficient to achieve both the desired melting point inversion and the separations of fresh water from the hydrocarbon slurry.

FIG. 2 EMBODIMENT

The embodiment of the invention illustrated in FIG. 2 operates by principles almost identical to those governing the operation of the rotoverter depicted in FIG. 1. Structurally, however, the embodiments are substantially different. In the FIG. 2 embodiment, the ice-hydrocarbon mixture is charged to the rotoverter structure 70 through a suitable conduit 72. The conduit 72 projects into the top of an axially extending mixture intake duct 74. The duct 74 includes a flared lower portion 76 into which the axial flow passageway through the duct opens. A housing 78 includes a barrier wall 78a, upwardly facing, conically shaped central portion 78b, and has an overturned, outwardly directed discharge lip 78c at the upper end thereof which is positioned radially inwardly from the barrier wall 78a. The housing 78 has formed integrally therewith and projecting from the center of the bottom thereof in axial alignment with the intake duct 74, a mounting stem 80 which includes a conical portion 80a and a cylindrical portion 80b. The cylindrical portion 80b of the mounting stem 80 has keyed thereto a drive gear 82 which is disposed within a stationary mounting housing 84. A suitable suspension system which includes the springs 86 may be employed for supporting the mounting housing 84 to permit it to yield as necessary to accommodate the rotoverter 70 when it is rotating at high speeds with the existence therein of some unbalance or displacement from the axial center line of its center of gravity.

To permit the rotoverter 70 to rotate about an axis extending concentrically in the duct 74 and coaxially through the mounting stem 80, suitable bearings 88 and 90 are provided between the mounting stem 80 and the mounting housing 84. A suitable motor 92 is provided and is directly connected to a gear 94 located inside the housing 84 and driving the drive gear 82 through the intermediate gears 96 and 98 mounted on a shaft 100 which is journaled in the housing.

Disposed within the housing 78 of the rotoverter 70 between the exterior portion of the housing and the exterior surface of the intake duct 74 is an annular flow divider panel 102. At its upper end, the flow divider panel 102 carries an outwardly turned discharge lip 102a. It should be noted that the flow divider panel 102, the intake duct 74, and the housing 78 are all secured together for common rotational movement about an axis of rotation by means of suitable spiders or braces (not shown). The arrangement of the intake duct 74, housing 78, the flow divider panel 102 with respect to each other is such that a radially outwardly extending, annular mixture supply passageway 104 exists to convey the mixture from the interior of the intake duct 74 to a confining chamber 106 adjacent the barrier wall 78a. The intake duct 74 and flow divider panel 102 define therebetween, a radially inwardly extending slurry discharge channel 108 which extends radially inwardly over a portion of its length, and then substantially parallel to the axis of rotation of the rotoverter 70. Extending in a radially inward direction and substantially parallel to the slurry channel 108 is a water channel 110 which is located between the flow divider panel 12 and the conically shaped wall portion 78b of the housing 78.

Cooperating with the rotoverter 70 to receive fluid discharged therefrom is a fluid collector assembly designated generally by reference numeral 112. The fluid collector assembly 112 is supported on any suitable stationary mounting structure and includes an internally located, conically shaped slurry collection manifold 114 which is characterized in having a radially inwardly turned annular lip 114a which passes beneath and cooperates with the discharge lip 102a for receiving slurry discharged from the slurry channel 108. An outwardly located, conically shaped, water collection manifold 116 carries at its lower end a radially inwardly turned lip 116a which extends adjacent and under the lip 78c for receiving water from the water channel 110.

The inwardly turned lip 116a forms an annular water flow way which receives water from the rotoverter 70 and permits it to be discharged through a suitable pipe 120. The inwardly turned lip 114a forms an annular slurry flow way which receives slurry from the rotoverter and permits it to be discharged through a suitable pipe 122.

OPERATION OF FIG. 2 EMBODIMENT

In the operation of the embodiment of the rotoverter depicted in FIG. 2, the hydrocarbon and ice mixture is charged to the rotoverter 70 from the conduit 72 and passes downwardly therein through the intake duct 74 and out of the lower end thereof. The mixture then spreads in the radial direction through the mixture supply passage 104 to enter the annular confining chamber 106 which is disposed near the radially outer extremity of the housing 78. During the introduction of the mixture in the manner described, the rotoverter 70 is driven at a relatively high speed of rotation by the motor 92 through the gears 94, 96, 98, and 82.

The forces acting upon the mixture in the annular confining chamber 106 cause the mixture to be subjected to a pressure above the inversion pressure which is required to melt the ice and freeze particles of the hydrocarbon material to generate a slurry. Simultaneously, a force effecting a separation of the components of the mixture according to density acts on the mixture, with the result that the water moves to the outside of the rotoverter and the hydrocarbon slurry which is formed in the confining chamber 106 tends to occupy a position which is relatively inward in a radial sense with respect to the water. The slurry then moves into the slurry channel 108 and the water into the water channel 110. It is to be noted that the slurry channel 108 and water channel 110 are directed radially inwardly from the confining chamber 106 so that a portion of the energy supplied to move the mixture outwardly in the rotoverter and to effect the exchange crystallization and separation is recovered.

Toward the upper end of the rotoverter 70, water moving in the water channel 110 flows over the radially outwardly turned annular lip 78b to enter the water flow way formed by the cooperating annular lip 116a of the water collection manifold 116. The fresh water is then removed from this flow way through the pipe 120. The hydrocarbon slurry, now suitable for use in the first step of the exchange crystallization method of desalination, flows over the outwardly turned lip 102a and into the slurry flow way formed by the annular lip 114a. The slurry thus collected is discharged through the pipe 122.

EMBODIMENT OF FIG. 3

Figure 3:
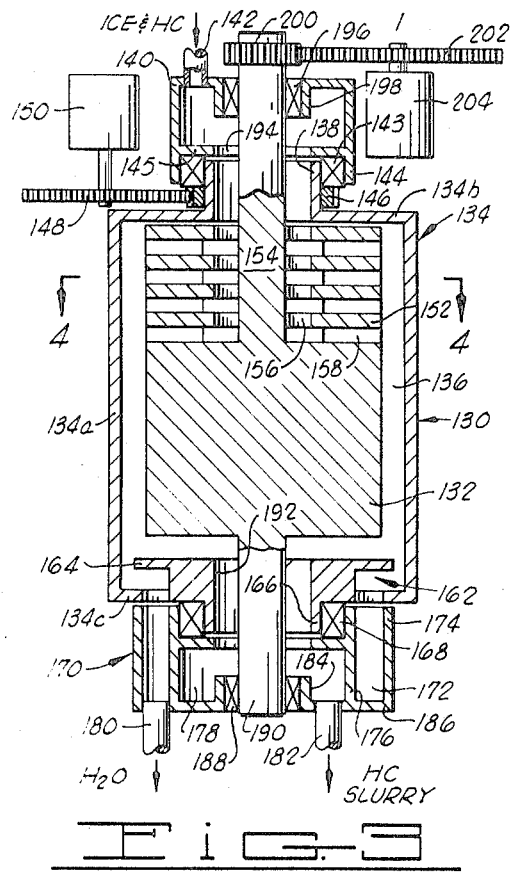
FIG. 3 is a view, partially in section and partially in elevation, of yet another embodiment of the rotoverter apparatus which can be utilized in the present invention.

The rotoverter 130 which is depicted in FIG. 3 includes an internal core 132 which is concentrically surrounded by a housing designated generally by reference numeral 134 and having peripheral barrier wall 134a and a pair of radially extending end walls 134b and 134c. An annular space constituting a confining chamber 136 is located between the barrier wall 134a and the inner core 132. Extending axially outwardly from the center of the wall 134b, the housing 134 carries a mixture intake duct 138 which receives from an input manifold 140, a mixture to be subjected to exchange crystallization and separated into fractions. A mixture of, of example, ice and hydrocarbon, is charged to the input manifold 140 through a suitable pipe or conduit 142. An annular bearing 143 is provided around the input duct 138, and, in addition to its bearing function, forms a seal between this duct and between flanges 145 and 144 forming portions of the input manifold 140. It will be appreciated that the input manifold 140 is stationary while the intake duct 138, in forming a portion of the housing 134, is movable in rotation with the housing. The housing 134 is supported on a central framework (not visible) in a suitable manner so as to be journaled in the sealing bearing 143, and the input duct 138 has keyed thereto an annular gear 146 which is driven in rotation by a meshing gear 148 drivingly connected to a suitable motor 150.

Figure 4:
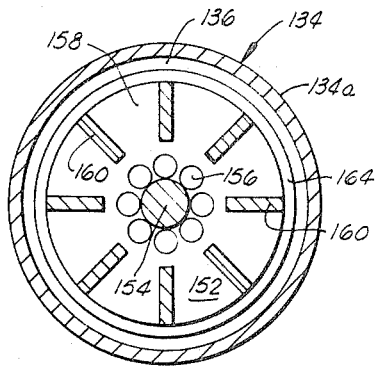
FIG. 4 is a sectional view taken along line 4—4 of FIG. 3.

The internal core 132 is provided at its end adjacent the end wall 134b of the housing 134 with a plurality of radially extending fins 152 which are secured to an axially extending drive shaft 154. Adjacent the drive shaft 154, each of the radially extending fins 152 is provided with a plurality of circumferentially spaced fluid passageways 156 (see FIG. 4). The fluid passageways 156 communicate with radial channels 158 defined by radially extending webs 160 which are secured between, and interconnect, the fins 152. The purpose of the described arrangement of radially extending fins 152 and their interconnecting webs 160, along with the channels 158 and the fluid passageways 156 will be hereinafter explained.

At its end adjacent the end wall 134c, the housing 134 is secured to a baffle insert assembly designated generally by reference numeral 162. The baffle insert assembly 162 has a radially extending diversion flange 164 at its side located internally in the housing 134, and is also provided with an axially extending flange 166 which projects outside the housing 134 and into a bearing 168 which supports and journals the baffle insert 162 in a stationary discharge manifold designated generally by reference numeral 170. The stationary discharge manifold 170 is mounted on a suitable framework (not visible) and includes an annular dense fraction chamber 172, defined between annular, axially extending walls 174 and 176, and a light fraction chamber 178. An offtake conduit 180 is connected to the discharge manifold 170 so as to communicate with the annular dense fraction chamber 172, and a second offtake conduit 182 is secured to the discharge manifold 170 so as to communicate with the light fraction chamber 178. An inturned flange 184 extends axially inwardly from the end wall 186 of the discharge manifold 170 and accommodates a suitable sealing bearing 188 which sealingly journals an end of an elongated shaft 190 which is secured to, and projects axially from, the insert core 132. It will be noted that the baffle insert assembly 162 is provided with a centrally located, axially extending bore 192 which coaxially surrounds the shaft 190 and provides a fluid passageway communicating with the chamber 178 for a purpose hereinafter described.

It will further be noted that the shaft 154 which projects from the opposite end of the internal core 132 from the shaft 190 extends coaxially through intake duct 138, through a central aperture 194 formed in the annular, radially inwardly extending flange 145 and through a suitable sealing bearing 196 which supports the shaft in an annular, axially extending flange 198 forming a part of the input manifold 140. At its ends which project outside of the input manifold 140, the shaft 154 carries a drive gear 200 which engages a gear 202 drivingly connected to a motor 204.

OPERATION OF FIG. 3 EMBODIMENT

In the operation of the embodiment of the invention which is depicted in FIG. 3, the housing 134 of the rotoverter 130 is driven in rotation about a central rotational axis by the motor 150 through the drive gears 148 and 146. Simultaneously, the inner core 132 is drive in rotation about the same rotational axis as the housing 134 by means of the motor 204 through the drive gears 202 and 200. The core 132 is driven independently of the housing 134 and may be rotated at the same or a different rotational speed from the housing. The ice and hydrocarbon mixture is fed to the input manifold 140 through the conduit 142 and from the input manifold, the mixture passes into the intake duct 138. From the intake duct 138, the mixture moves into the fluid passageways 156 in the inner core 132 and then into the radial channels 158. Ultimately, the mixture reaches the confining chamber 136 defined between the central core 132 and barrier wall 134a.

In the upstream portion of the confining chamber 136, the mixture is subjected to agitation produced by the rotation of the radially extending fins 152 and the interconnecting webs 160. The turbulence in the mixture can be further amplified by rotating the inner core 132 at a different speed from the housing 134. This aids in boosting the efficiently of the heat exchange as the mixture is subjected to a pressure sufficient to melt the ice and freeze particles of hydrocarbon from the hydrocarbon liquid. As the mixture passes downstream in the confining chamber 136 (toward the baffle insert assembly 162), the rotational motion of the rotoverter 130 moves the relatively dense, water rich fraction toward the outside of the confining chamber 136 and against the barrier wall 134a. Finally, when the mixture reaches the end of the housing 134 which contains the baffle insert assembly 162, the water rich fraction, being located radially outwardly in the confining chamber 136, passes around the radially outwardly extending diversion flange 164 and moves into the annular, dense fraction chamber 172 of the stationary discharge manifold 170. From this point, the water rich fraction is discharged through the offtake conduit 180 to any desired destination.

The relatively less dense hydrocarbon slurry, in occupying a position relatively near the internal core 132, moves radially inwardly across the inwardly facing surface of the baffle insert assembly 162 and then is discharged through the axially extending bore 192 and the baffle insert assembly into the light fraction chamber 178 of the discharge manifold 170. From this chamber, the hydrocarbon slurry can be removed through the offtake conduit 182. As has previously been pointed out, the return of at least a portion of the mixture charged to the rotoverter 130 to a position relatively close to the axis of rotation of the apparatus permits a reduction in the total energy input required to effect exchange crystallization and separation to be achieved.

EMBODIMENT OF FIG. 5

The rotoverter embodiment depicted in FIG. 5 is designated by reference numeral 210 and includes a solid cylindrical block 212 having a centrally bored, axially extending intake duct 214 projecting from one end face 212a of the block, and a centrally bored, axially extending discharge duct 216 extending from the center of the opposite end face 212b of the cylindrical block. The rotoverter 210 is journaled in a suitable stationary framework 219 for rotation about an axis extending through the center thereof by means of an annular bearing 218 which surrounds the intake duct 214, and an annular sealing bearing 220 which surround the discharge duct 216 and which is positioned within an axially extending annular flange 222 forming a part of a discharge manifold, designated generally by reference numeral 224. The discharge manifold 224 has an annular fluid pickup flow way 226 which is located between the flange 222 and a parallel, axially extending flange 228. A suitable discharge pipe 230 is secured to the discharge manifold 224 and communicates with the fluid pickup flow way 226. Keyed to the outside of the fluid intake duct 214 is an annular drive gear 232 which is driven in rotation by a gear 236 driven from the motor 238. A suitable mixture input conduit 240 extends into the intake duct 214 and has its outer periphery spaced inwardly slightly from the internal wall of this duct so that the input conduit 240 may remain stationary while the intake duct 214 rotates therearound in the bearing 218. In some instances, it will, however, be desirable to provide a seal between the input conduit 240 and the intake duct 214.

The construction of the interior of the cylindrical block 212 may be best perceived by considering FIG. 6 in conjunction with FIG. 5. It will be noted in referring to FIG. 5 that a bore through the intake duct 214 communicates with a plurality of radially extending fluid passageways 242. The radially extending fluid passageways 242 are formed in the solid cylindrical block 212 and intersect a plurality of axially extending passageways 246, which, in this embodiment of the invention, collectively constitute the confining chamber in which exchange crystallization and component separation occur. The axially extending fluid passageways 246 communicate at their ends opposite the ends in communication with the radially extending fluid passageways 242 with radially inwardly extending fluid discharge passageways 248. It will also be noted in referring to FIGS. 5 and 6 that small axially extending fluid discharge ports 250 are formed in the solid cylindrical block 212 at the intersection of the fluid discharge passageways 248 with respective axially extending passageways 246. The fluid discharge ports 250 communicate with radical bores 252 which, in turn, communicate with axially extending dense fraction discharge ports 254. The dense fraction discharge ports 254 open through the end face 212b of the solid cylindrical block 212 in a position to discharge a separated portion of the mixture subjected to the process of the invention into the fluid pickup flow way 226 of the discharge manifold 224.

OPERATION OF FIG. 5 EMBODIMENT

In the operation of the embodiment depicted in FIG. 5, the rotoverter 210 is driven in rotation by the motor 238 through the gears 232 and 236. During rotation of the rotoverter, a mixture of ice and liquid hydrocarbon is charged to the intake duct 214, and from the axial or center bore extending through the intake duct 214, the mixture moves outwardly through the radially extending fluid passageways 242. From the radially extending passageways 242, the mixture enters the axially extending passageways 246 constituting the confining chamber of this embodiment of the invention, and here the mixture is subjected to forces of compression and separation which, as previously explained, melt the ice and form a hydrocarbon slurry, while causing the water to move outwardly toward the outside wall of the axially extending passageways 246 and causing the hydrocarbon slurry to move toward the inside of these passageways.

Under pressure from a pump connected to the input conduit 240, the separated fraction of the mixture are moved into the radially extending fluid discharge passageways 248, and into the fluid discharge ports 250. Due to the fact that the water is located relatively outwardly in the axially extending passageways 246, a fraction rich in water moves through the fluid discharge ports 250, into the radial ports 252, and into the axially extending dense fraction discharge ports 254. The water is then picked up from these discharge ports by the fluid pickup flow way 226 of the discharge manifold 224. Finally, the water fraction is taken off through the discharge pipe 230.

The hydrocarbon slurry, being the less dense of the separated fractions, moves radially inwardly in the fluid discharge passageways 248 so that there is a recovery of some of the energy required to accelerate the liquid during rotation into the axially extending passageways 246. The slurry is ultimately discharged through the axial bore in the discharge duct 216.

EMBODIMENT OF FIG. 7

Another embodiment of the invention as illustrated in FIG. 7 includes a rotoverter structure 260 which is mounted for rotation in a suitable bearing 262 carried by a framework (not shown). The rotoverter 260 includes a generally cylindrical housing having a cylindrical wall 266 at the outer periphery thereof, and a pair of end walls 268 and 270 at the opposite ends thereof. Extending from the center of the end wall 268 is a sleeve 272 having an axial bore therethrough and provided at its outer end with a radially outwardly extending flange 274. A drive gear 276 is keyed to the sleeve 272 and drivingly engages suitable gearing 278 provided for the purpose of rotating the rotoverter 260 about an axis extending through the center of the cylindrical housing. Projecting into the sleeve 272, and preferably sealingly engaging the inner wall thereof is a mixture charging conduit 280. The mixture charging conduit 280 is aligned with the open end of an axially extending intake portion 284 of a helically formed compression pipe 286. The helically formed compression pipe 286 has a radially extending leg 288 which interconnects the helical convolutions of the compression pipe with the axially extending intake portion 284.

At its end opposite the axially extending intake pipe 284, the helically formed compression pipe 286 has a radially inwardly turned end portion 290 which is bifurcated to provide a dense fraction offtake tube 292 and a light fraction offtake tube 294. It will be noted in referring to FIG. 7 that the dense fraction offtake tube 292 is aligned with the outer peripheral wall of the convolutions of the helical compression pipe 286, and the light fraction offtake tube 294 is aligned with the radially inner wall of these convolutions.

The dense fraction offtake tube 292 and the light fraction offtake tube 294 extend through the end wall 270 of the cylindrical 260 with the dense fraction offtake tube entering a water flow way 296 defined a pair of parallel, axially extending flanges 298 and 300 forming a portion of a fluid discharge manifold designated generally by reference numeral 302 which is supported in a suitable framework 304. The light fraction offtake tube 294 extends through an axially extending, centrally bored neck portion 306 which is secured to the center of the end face 270 of the cylindrical housing 260. The neck portion 306 is journaled in an annular bearing 308 which is disposed between the neck portion 306 and the axially extending flange 300 of the discharge manifold 302.

OPERATION OF FIG. 7 EMBODIMENT

In the embodiment of the invention depicted in FIg. 7, the mixture of ice and hydrocarbon is introduced to the rotoverter 260 through the mixture charging conduit 280. The mixture passes through the intake portion 284 of the helically formed compression pipe 286, and is directed radially outwardly through the radially extending leg 288. From this leg, the mixture enters the helical convolutions of the compression pipe 286, and is subjected to the previously described forces which result in the occurrence of exchange crystallization and concurrent separation of the mixture into a relatively light and relatively dense fraction.

The dense fraction, which is rich in water derived from melted ice crystals, is forced to the outside of the convolutions of the helically formed compression pipe, whereas the hydrocarbon slurry formed during the exchange crystallization occupies a radially inward position in the compression pipe. As the separated fractions enter the radially inwardly directed conduit portion 290 of the compression pipe, the fractions are separated by the bifurcation in the conduit portion 290 so that the water rich fraction is channeled into the dense fraction offtake tube 292, and the hydrocarbon slurry enters the light fraction offtake tube 294. The water rich dense fraction is diverted into the water flow way 296, and from this point, is removed through the water discharge pipe 305.

EMBODIMENT OF FIG. 9

In the embodiment of the invention illustrated in FIg. 9, a rotoverter 350 includes a cylindrical housing having a cylindrical outer peripheral barrier wall 352 closed at its opposite ends by an end wall 354 and an end wall 356. Projecting axially outwardly from the end wall 354 is an intake duct 358 which is provided with a central bore therethrough, and which is journaled in a bearing 360 carried by a framework 362. Projecting from the end face 356 in an axial direction is a shaft 364 which is journaled in a bearing 366 carried by a framework 368.

Positioned in the center of the cylindrical housing of the rotoverter 350 and coaxially aligned with the intake duct 358 and the shaft 364 is a central core 370. The central core 370 has a plurality of axially spaced, radially extending annular fins 372 formed therearound projecting into the annular space 374 which forms a confining chamber between the central core 370 and the barrier wall 352. At one of its ends, the central core 370 is secured to, or formed integrally with, the end wall 356, and a radially extending annular baffle plate 376 is secured to the central core between the fins 372 and the end wall 356.

Extending axially inwardly within the cylindrical housing from the end wall 354 thereof is a baffle structure designated generally by reference numeral 380. The baffle structure 380 includes a radially extending baffle plate 382 which, it will be noted, extends into closer proximity to the barrier wall 352 than does the baffle plate 376 located at the opposite end of the cylindrical housing. Between the baffle plate 382 and the central core 370, a ported neck is secured, and is provided with radial ports 384 which communicate with the axial bore through the intake duct 358 by way of an axial bore extending through the center of the baffle structure 380. A water discharge port 386 is provided through the end wall 354, and communicates with the annular space 387 disposed between the baffle plate 382 and the end wall 354. At the other end of the rotoverter 350, a slurry discharge port 388 is provided through the end wall 356, and communicates with the annular space 389 located between the baffle plate 376 and the end wall 356.

OPERATION OF FIG. 9 EMBODIMENT

In the embodiment depicted in FIG. 9, the rotoverter 350 is rotated in the bearings 360 and 366 as hereinbefore described. During rotation of the rotoverter, the ice crystals and hydrocarbon liquid are charged to the interior of the rotoverter through the intake duct 358. From the intake duct 358, the mixture passes radially outwardly through the radial ports 384 and enters the space 374 which constitutes the confining chamber in which exchange crystallization is made to occur.

After it has entered the annular space 374, the ice and hydrocarbon mixture is subjected to pressurizing forces which are of sufficient magnitude to melt a substantial portion of the ice crystals, and to convert a part of the hydrocarbon liquid to solid particles. There is now disposed in the confining chamber 374 a mixture of water and hydrocarbon slurry and, as previously explained, these materials are separated by the acting centrifugal force so that the relatively dense, water rich fraction is moved to the outside of the confining chamber and adjacent the barrier wall 352, while the slurry takes a relatively inwardly located position adjacent the fins 372.

Since the baffle plate 382 extends a relatively greater distance toward the confining wall 352 than does the baffle plate 376, the annular passageway between the baffle plate 382 and the confining wall is accessible to the water rich portion of the mixture which is adjacent the barrier wall 352, but is not readily accessible to the hydrocarbon slurry which is positioned radially inwardly of the water rich fraction. Instead, the slurry can pass by the lesser diameter baffle plate 376 located at the opposite end of the rotoverter housing, and enter the annular space 389 located between the baffle plate 376 and the end face 356. From this location, the hydrocarbon slurry can be discharged through the slurry discharge port 388. It will be perceived that the axial spacing of the locations at which the water rich, relatively dense fraction is removed from the rotoverter, and at which the hydrocarbon slurry is removed, results in a countercurrent flow of these fractions within the rotoverter. This effect is desirably in some instances in order to promote more efficient heat exchange between the hydrocarbon and the ice particles.

EMBODIMENT OF FIG. 10

In FIG. 10, the rotoverter 390 is mounted in a framework designated generally by reference numeral 392. The framework 392 includes a horizontal supporting beam 394 which is supported by a pair of vertically extending frame members 396. The vertically extending frame members 396 are supported on a horizontal frame member 398 which rests upon transverse skids 400 or other suitable supporting members. An annular water pickup trough 402 is welded or otherwise suitably secured to the horizontal brace member 398 and defines an annular upwardly facing channel for a purpose hereinafter described.

Secured to the under side of the horizontal supporting beam 394 at about the central portion thereof is a motor 404 which has a shaft 406 extending downwardly therefrom. The shaft 406 is secured through a suitable spider to a collection chamber 408. A mixture input conduit 409 is secured to the supporting beam 394 and has a discharge end positioned for discharging the mixture into the collection chamber 408. The collection chamber 408 has its lower end secured to, and closed by, an elongated plate 410 which supports a pair of elongated fluid conduits 412 which extend radially outwardly from opposite sides of the collection chamber. Each of the conduits 412 is curved at its outer end 413 to a generally U-shaped configuration, and after curving so as to be directed inwardly in a radial sense, each conduit is bifurcated so that ta water discharge branch 414 and a slurry discharge branch 416 extend therefrom. The water discharge branch 414 has an outlet extending into an upwardly facing channel formed by the annular water pickup trough 402. A water discharge pipe 424 extends from the annular water pickup trough 402 to a suitable pump 426 which pumps water from the trough to a suitable discharge point. The hydrocarbon slurry discharge branch 416 extends radially inwardly into proximity to the collection chamber 408, and has a upwardly turned end portion which opens at a location such that hydrocarbon slurry can be discharged into an annular slurry pickup channel 418. The annular slurry pickup channel is supported by a plurality of diagonal braces 419 secured to the supporting beam 394, and is connected to a slurry discharge pipe 420. The slurry discharge pipe 420 is connected to a pump 422 which permits slurry to be pumped from the channel 418 to a suitable discharge point. It will be noted that the curved or U-shaped outer end portions 413 of the fluid conduits 412 may be said to form confining chambers, and that the radially outermost end portions of these conduits have wall portions which may be equated to the barrier walls of the rotoverters to which reference has hereinbefore been made.

OPERATION OF FIG. 10 EMBODIMENT

In the operation of the embodiment of the invention depicted in FIG. 10, the rotoverter 390 is driven in rotation within the framework 392 by the motor 404, and a mixture of ice crystals and liquid hydrocarbon is charged to the input conduit 409, and flows through this conduit into the collection chamber 408. From the collection chamber 408, the mixture of ice crystals and hydrocarbon is propelled radially outwardly in the oppositely extending fluid conduits 412 by centrifugal force. At the curved outer ends of the fluid conduits 412, the pressure imposed on the mixture is increased and the mixture is subjected to the separatory forces resulting from centrifugation.

At this point, the ice crystals are melted and particles of the hydrocarbon are frozen as hereinbefore described. Simultaneously, the water is thrown to the outside of the end portions 413 of the fluid conduits 412 and is then directed into the water discharge branch 414. The hydrocarbon slurry which is generated by exchange crystallization occupies a position radially inwardly within the end portions 413 of the fluid conduits 412 and therefore enters the hydrocarbon slurry discharge branch 416 and is directed radially inwardly back into the proximity of the collection chamber 408.

The slurry is ultimately discharged into the annular slurry pickup channel 418, and from this point is pumped off through the discharge pipe 420 by the pump 422. Water which is collected within the water pickup trough 402 is pumped from this location through the discharge pipe 424 by the pump 426.

Although certain specific embodiments of the apparatus useful in the practice of the present invention have been herein described, and certain variations in the procedure employed in the invention have been identified, it will be recognized that various changes and innovations can be made in the described structure, and the procedural steps discussed, without departure from the principles upon which the invention is based. Modifications and changes of this type are therefore deemed to be circumscribed by the spirit and scope of the invention except as the same may be necessarily limited by the appended claims or reasonable equivalents thereof.

What is claimed is:

1. A process for effecting exchange crystallization and component separation in a mixture of nongaseous materials, which mixture includes a first material which undergoes an increase in melting point upon being subjected to an increase in pressure, and a second material of differing density from said first material, which second material undergoes a decrease in melting point upon being subjected to an increase in pressure, said process comprising:

bringing the temperature and pressure of said mixture to a level at which at least a portion of said second material is a solid, and at least a portion of said first liquid is a liquid;

positioning the mixture in a confining chamber having a barrier wall;

moving the confining chamber through a curvilinear path to subject the mixture to an acceleration producing force tending to move the chamber into a linear path, and also to force the mixture against the barrier wall of the confining chamber, said confining chamber being moved through said curvilinear path at a velocity sufficient to melt at least a portion of the solid second material, and to freeze at least a portion of the liquid first material; and removing from the confining chamber from a location relatively nearer to said barrier wall than the location in said confining chamber from which a hereinafter described second quantity is removed, a first quantity of nongaseous material derived from said mixture and containing a higher proportion of said second material than said mixture contains; and removing from a location relatively farther removed from said barrier wall than the location from which said first quantity of nongaseous material is removed, a separate second quantity of nongaseous material derived from said mixture, and containing a higher proportion of said first material than said mixture contains, said second quantity further containing at least some of said first material in the solid state.

2. A process as defined in claim 1 wherein said first and second quantities of nongaseous materials are removed from said confining chamber while said confining chamber is being moved through said curvilinear path.

3. A process as defined in claim 1 and further characterized to include the steps of agitating said mixture immediately after it enters said confining chamber:

then removing said mixture out of the zone of agitation in said mixing chamber.

4. A process as defined in claim 1 wherein said confining chamber is moved in a circular path about an axis of rotation.

5. A process as defined in claim 1 wherein said mixture is continuously positioned in, and said first and second quantities are continuously removed from, said confining chamber during the movement of the confining chamber through said curvilinear path.

6. A process as defined in claim 1, wherein said mixture includes ice and a hydrocarbon having a melting point which is slightly below the melting point of ice at atmospheric pressure.

7. A process as defined in claim 1 wherein said mixture is retained in said confining chamber until substantially all of said second material is melted, and substantially all of the second material from said mixture is located in said first quantity.

8. A process as defined in claim 1 wherein said first and second quantities are discharged from said confining chamber in two separate streams.

9. A process as defined in claim 8 wherein said mixture includes ice and a hydrocarbon having a melting point which is slightly below the melting point of the ice at atmospheric pressure.

10. A process as defined in claim 8 wherein said process is further characterized to include the steps of agitating said mixture immediately after it enters said confining chamber;

then moving said mixture out of the zone of agitation in said confining chamber.

11. A process as defined in claim 10 wherein said mixture is retained in said confining chamber until substantially all of said solid second material is melted, and substantially all of said second material from said mixture is located in said first quantity.

12. A process as defined in claim 11 wherein said first and second quantities are removed from said confining chamber while said confining chamber is being moved through said curvilinear path.

* * * * *